(12) United States Patent
Gleu et al.

(10) Patent No.: US 11,707,959 B2
(45) Date of Patent: Jul. 25, 2023

(54) AIR SPRING STRUT WITH A PLASTICS AIR SPRING COVER

(71) Applicant: Continental Teves AG & Co. OHG, Frankfurt am Main (DE)

(72) Inventors: Jens-Uwe Gleu, Langenhagen (DE); Martin Ballmann, Hannover (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 235 days.

(21) Appl. No.: 16/836,506

(22) Filed: Mar. 31, 2020

(65) Prior Publication Data

US 2020/0223275 A1    Jul. 16, 2020

Related U.S. Application Data

(63) Continuation of application No. PCT/EP2018/076965, filed on Oct. 4, 2018.

(30) Foreign Application Priority Data

Oct. 4, 2017 (DE) ................. 10 2017 217 614.8
Dec. 1, 2017 (DE) ................. 10 2017 221 706.5

(51) Int. Cl.
  B60G 15/12 (2006.01)
  F16F 9/04 (2006.01)
  (Continued)

(52) U.S. Cl.
  CPC ............ B60G 15/12 (2013.01); F16F 9/0472 (2013.01); F16F 9/05 (2013.01); F16F 13/002 (2013.01);
  (Continued)

(58) Field of Classification Search
  CPC ............... B60G 15/12; B60G 2202/32; B60G 2204/1262; B60G 2206/424;
  (Continued)

(56) References Cited

U.S. PATENT DOCUMENTS 1,070,315 A    8/1913  Andersen
4,796,870 A *  1/1989  Hoffman ................ F16F 9/084
                                                  403/267
(Continued)

FOREIGN PATENT DOCUMENTS

CN    201250875       6/2009
CN    101500827 A     8/2009
(Continued)

OTHER PUBLICATIONS

Chinese First Office Action dated Mar. 15, 2021 for the counterpart Chinese Patent Application No. 201880052201.2.
(Continued)

*Primary Examiner* — Robert A. Siconolfi
*Assistant Examiner* — James K Hsiao

(57) ABSTRACT

An air spring strut for a motor vehicle comprising an air spring with a shock damper for the spring-cushioning and damping of oscillations of a motor vehicle chassis, wherein the air spring comprises an air spring cover and a rolling piston, wherein a rolling bellows of elastomer material is clamped in an airtight manner between the air spring cover and the rolling piston, wherein the air spring cover comprises a damper bearing receptacle in which a damper bearing of the shock damper is arranged, and wherein the air spring cover comprises a clamping base to which a first end of the rolling bellows is attached, wherein at least the damper bearing receptacle of the air spring cover is produced from a plastic material.

17 Claims, 2 Drawing Sheets

(51) Int. Cl.
*F16F 9/05* (2006.01)
*F16F 13/00* (2006.01)

(52) U.S. Cl.
CPC .. *B60G 2202/32* (2013.01); *B60G 2204/1262* (2013.01); *B60G 2206/424* (2013.01); *B60G 2206/7104* (2013.01); *B60G 2800/162* (2013.01); *F16F 2224/0241* (2013.01)

(58) Field of Classification Search
CPC ....... B60G 2206/7104; B60G 2800/162; F16F 9/0472; F16F 9/05; F16F 13/002; F16F 2224/0241
See application file for complete search history.

(56) References Cited

U.S. PATENT DOCUMENTS

| | | | | |
|---|---|---|---|---|
| 4,946,144 | A * | 8/1990 | Geno | F16F 9/0463 267/64.27 |
| 4,988,081 | A | 1/1991 | Dohrmann | |
| 6,234,460 | B1 | 5/2001 | Arnold | |
| 6,336,610 | B1 * | 1/2002 | Wode | F16F 9/084 267/64.19 |
| 6,843,472 | B2 * | 1/2005 | Henry, III | B60G 15/14 267/64.24 |
| 7,258,330 | B2 * | 8/2007 | Harms | F16F 9/38 267/64.23 |
| 7,284,644 | B2 * | 10/2007 | Cmich | B60G 15/12 267/293 |
| 8,376,327 | B2 * | 2/2013 | Lee | B60G 15/12 267/113 |
| 8,973,932 | B2 * | 3/2015 | Pielock | F16F 9/0463 280/124.157 |
| 9,630,471 | B2 * | 4/2017 | Kato | F16F 9/58 |
| 10,525,782 | B2 * | 1/2020 | Derr | F16F 9/54 |
| 10,703,158 | B2 * | 7/2020 | Pielock | F16F 9/54 |
| 2002/0011697 | A1 * | 1/2002 | Pesch | F16F 9/084 267/64.23 |
| 2004/0017035 | A1 * | 1/2004 | Treder | F16F 9/54 267/220 |
| 2004/0119212 | A1 * | 6/2004 | Gleu | F16F 9/05 267/64.11 |
| 2004/0222576 | A1 * | 11/2004 | Oldenettel | F16F 9/361 267/64.19 |
| 2005/0236749 | A1 * | 10/2005 | Gross | F16F 9/0454 267/122 |
| 2010/0001444 | A1 | 1/2010 | Weber | |
| 2010/0044937 | A1 | 2/2010 | Lee et al. | |
| 2010/0104228 | A1 * | 4/2010 | Kaneko | F16C 33/20 384/420 |
| 2012/0153550 | A1 | 6/2012 | Sert | |
| 2013/0009376 | A1 * | 1/2013 | Kaneko | F16C 33/20 384/216 |
| 2013/0025448 | A1 | 1/2013 | Nowotka | |
| 2014/0246817 | A1 * | 9/2014 | Bounds | F16F 9/049 29/896.9 |
| 2014/0252743 | A1 | 9/2014 | Pielock | |
| 2015/0159725 | A1 | 6/2015 | Gleu | |
| 2016/0023529 | A1 * | 1/2016 | Wilkin | F16F 1/12 267/221 |
| 2016/0108985 | A1 * | 4/2016 | Pniewski | F16F 9/084 267/64.27 |
| 2016/0176258 | A1 * | 6/2016 | Bounds | F16F 9/0454 267/64.24 |
| 2017/0219041 | A1 * | 8/2017 | Debruler | F16F 9/05 |
| 2018/0015800 | A1 * | 1/2018 | Derr | B60G 11/28 |
| 2019/0186579 | A1 * | 6/2019 | Jerisk | F16F 9/05 |
| 2019/0186580 | A1 * | 6/2019 | Pielock | F16F 9/0472 |
| 2019/0360550 | A1 | 11/2019 | DeBruler | |
| 2020/0101808 | A1 * | 4/2020 | Rautenberg | F16F 9/3207 |
| 2020/0182263 | A1 | 6/2020 | Gleu | |
| 2020/0039309 | A1 | 7/2020 | Makkar | |

FOREIGN PATENT DOCUMENTS

| | | | | |
|---|---|---|---|---|
| CN | 201827289 | U | 5/2011 | |
| CN | 102574437 | A | 7/2012 | |
| CN | 103842191 | A | 6/2014 | |
| CN | 104428558 | A | 3/2015 | |
| CN | 204488956 | U | 7/2015 | |
| CN | 106414120 | A | 2/2017 | |
| CN | 106662187 | A | 5/2017 | |
| CN | 107107697 | A | 8/2017 | |
| DE | 10037026 | C1 | 11/2001 | |
| DE | 202004011432 | U1 | 9/2004 | |
| DE | 102004031875 | A1 | 11/2005 | |
| DE | 102004061989 | A1 | 7/2006 | |
| DE | 102009036554 | A1 | 7/2010 | |
| DE | 102011079986 | B3 | 10/2012 | |
| DE | 102012012902 | A1 | 1/2013 | |
| DE | 102012012995 | A1 | 1/2014 | |
| DE | 102013212982 | A1 | 6/2014 | |
| DE | 102015100281 | A1 | 7/2016 | |
| DE | 102015100281 | A1 * | 7/2016 | ............ B60G 11/28 |
| DE | 102016205741 | A1 | 10/2017 | |
| DE | 102016205741 | A1 * | 10/2017 | ............ B60G 11/27 |
| DE | 102018216992 | A1 | 4/2019 | |
| EP | 0264573 | B1 | 4/1988 | |
| EP | 0291720 | A2 | 11/1988 | |
| EP | 0976947 | A2 | 2/2000 | |
| EP | 1380452 | A2 | 1/2004 | |
| EP | 1424506 | A1 | 6/2004 | |
| KR | 20170006914 | A | 1/2017 | |
| WO | 2013/052930 | A2 | 4/2013 | |
| WO | 2016/110357 | A1 | 7/2016 | |

OTHER PUBLICATIONS

Chinese Second Office Action dated Dec. 3, 2021 for the counterpart Chinese Patent Application No. 201880052201.2.
International Search Report and Written Opinion dated Jan. 30, 2019 from corresponding International Patent Application No. PCT/EP2018/076965.
Search Report dated May 14, 2019 for corresponding German Patent Application No. DE 10 2018 216 994.2.

\* cited by examiner

AIR SPRING STRUT WITH A PLASTICS AIR SPRING COVER

CROSS REFERENCE TO RELATED APPLICATIONS

This application is a continuation application of PCT International Application No. PCT/EP2018/076965, filed Oct. 4, 2018, which claims priority to German Patent Application Nos. DE 10 2017 217 614.8, filed Oct. 4, 2017 and DE 10 2017 221 706.5, filed Dec. 1, 2017, wherein the contents of such applications are incorporated herein by reference.

TECHNICAL FIELD

The disclosure relates to an air spring strut with a plastics air spring cover.

TECHNICAL BACKGROUND

An air spring strut, as known for example from DE 10 2012 012 902 A1, is arranged between the motor vehicle chassis or a wheel carrier and the motor vehicle body. In general, the air spring strut comprises an air spring and a shock damper. Here, the air spring performs the function of cushioning the wheel, while the shock damper damps the oscillations of the wheel and of the motor vehicle body.

The air spring substantially consists of an air spring cover, a rolling piston and a rolling bellows clamped therebetween in an airtight manner, thereby delimiting a working chamber under air pressure. The rolling bellows is enclosed by a sleeve-shaped outer guide and, during spring compression, rolls on the concentric rolling piston with the formation of a rolling fold. By way of the air spring cover, the air spring strut is connected to the motor vehicle body by means of appropriate fastening means.

The shock damper arranged within the air spring is connected on the one hand to the wheel carrier and is supportively fastened on the other hand via a damper bearing in the air spring cover by way of its piston rod, which can dip into the damper tube. Particularly in the dynamic operation of the air spring strut, high tensile and compressive forces act particularly on the pot-shaped bearing receptacle of the air spring cover. Since the damper bearing of the shock damper is mounted in this bearing receptacle and since at the same time the entire air spring strut is connected via it to the body, this component must have particular strength properties.

As is known, the majority of large-volume air spring covers are produced from at least two components. Here, with an integrally bonded connection of the components, use is made of an identical material, usually a metal, from which particularly the bearing receptacle is produced. Such a cover is known for example from DE 10 2013 212 982 A1.

In addition, a wide range of requirements is placed on the air spring cover of an air spring strut. As already stated, the entire air spring strut is attached to the motor vehicle body via the air spring cover. Furthermore, the air spring cover, as a pressure body or as a cover comprising a large air volume, constitutes a part of the spring-effective inner volume of the air spring. The air spring cover must therefore also ensure a pressure-tight closure of the interior of the air spring to the outside. In addition, the rolling bellows is attached by means of clamping rings to a clamping base provided by the air spring cover. Finally, the air spring cover must also make available pressure-tight receptacles for the air connection and additional volumes.

As a connection element between air spring strut and attachment to the chassis, high forces are channeled through the air spring cover. These forces which are channeled in and through are, on the one hand, of a static nature (carrying forces for supporting the vehicle weight) and of a dynamic nature (time-variable forces in driving operation as a result of the spring compression/spring extension state), the dynamic forces being superimposed on the static forces. Dynamic tensile and compressive forces, which are dependent on the spring rate, act on the air spring cover at the attachment point of the shock damper (damper bearing).

The forces acting on the air spring cover of an air spring strut also arise through the internally pressurizing gas force of the spring-effective cover chamber, which gas force, as a result of the variable pressure, can be divided into static and dynamic fractions.

To achieve complete tightness of the air spring cover, it would be functionally advantageous to produce said cover as a closed sleeve made of a material or a group of materials which can be effectively connected to one another, wherein this component is not breached by other components having for example more optimal strength properties. This is because such a breach has in turn to be sealed by particular measures. Any sealing is susceptible in terms of its pressure-tightness and additionally represents a further process step.

A composite cover made of different materials, namely plastic and metal, is known for example from DE 10 2015 100 281 A1.

What is concerned in this case is a metallic upper part which is overmolded with a thermoplastic. There is thus created a composite part which satisfies the sealing and strength requirements. Here, a flange made of a metallic material is provided for the damper bearing, via which flange the connection to the chassis is also produced. The metallic damper bearing receptacle represents a good solution in terms of the strength requirements, but is very heavy on account of its density. Therefore, the remainder of the cover sleeve of the air spring cover is also produced from a thermoplastic material in order to save weight. Here, the flange is surrounded by the thermoplastic material at least in certain areas, whereby the gas-tightness of the air spring cover is achieved.

However, a disadvantage of this solution is that, for pressure-tightness, a pressure-tight connection is required between the inner metallic flange and the pressure-tight cover sleeve facing the cover interior. This is realized at least in that the damper bearing receptacle is also overmolded on the inner side by the thermoplastic material. Said receptacle is further provided with an insert and a guide for the piston rod in order to ensure sufficient tightness. In addition, the damper bearing receptacle is closed on the upper side by a pressure-tight closure cover. All these measures are necessary on account of the stated breach.

What is needed is an improved air spring cover of an air spring strut that ensures the gas-tightness in a simple manner, can at the same time be produced with a low weight and nevertheless has sufficient stability and strength.

DETAILED DESCRIPTION

Figure 1:
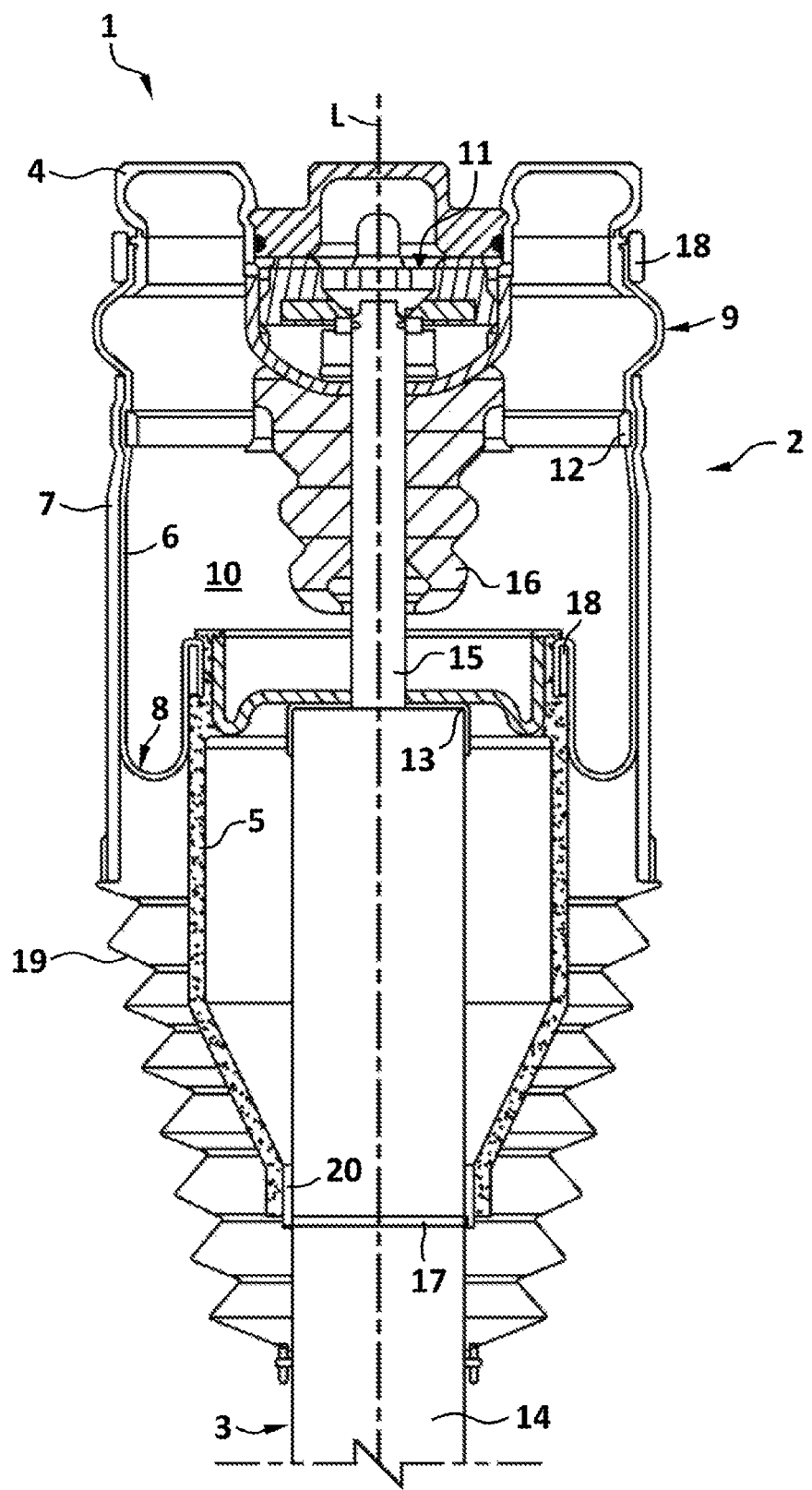
FIG. 1 shows an air spring strut according to the prior art.

According to the invention, an air spring strut for a motor vehicle is provided, comprising an air spring with a shock damper for the spring-cushioning and damping of oscillations of a motor vehicle chassis, wherein the air spring comprises an air spring cover and a rolling piston, wherein a rolling bellows of elastomer material is clamped in an airtight manner between the air spring cover and the rolling piston, wherein the air spring cover comprises a damper bearing receptacle in which a damper bearing of the shock damper is arranged, and wherein the air spring cover comprises a clamping base to which a first end of the rolling bellows is attached, wherein at least the damper bearing receptacle of the air spring cover is produced from a plastic material.

In principle, a person skilled in the art will have reservations in producing an air spring cover of an air spring strut, that is to say with mounting of the shock damper, exclusively from a plastic. This is because a plastic would not satisfy the strength requirements, in particular not in dynamic operation, as compared with a metallic material. Recourse has therefore always been had to a damper bearing receptacle produced from metal.

The plastic material is optionally a thermoset.

It has now been found in an inventive manner that a damper bearing receptacle produced from a plastic material can satisfy the force requirements, in particular said damper bearing receptacle is produced from a thermoset plastic. Given an appropriate wall thickness in the wall region and bottom region, the damper bearing receptacle satisfies the force requirements and proves to be extremely stable in permanent operation. In other words, the dynamic tensile and compressive forces which emanate from the shock damper are successfully taken up by the thermoset material of the damper bearing receptacle and channeled into the motor vehicle body.

Thermosets or thermoset materials are plastics which can no longer be deformed after they have been hardened by heating or other measures. They contain hard, amorphous, insoluble polymers. They are generally very hard and are therefore suitable as an adequate replacement for metallic materials.

The thermoset plastic has the key material property of a highly crosslinked structure and is at the same time lightweight and cost-effective. It can be processed easily and be formed as desired with known plastic injection-molding methods. More flexible and, in particular noncutting, production methods are thus possible. The design freedom of the cover geometry is widened and the cover can be produced more cost-effectively.

Finally, the thermoset material has a higher chemical resistance. The thermoset material ensures a sufficient gas-tightness of the air spring cover and there is no need for surface finishing. Particularly by comparison with metallic air spring covers, the otherwise necessary corrosion protection is no longer necessary, which leads to cost savings.

The damper bearing of the shock damper is placed in the inner damper bearing receptacle. The damper bearing represents an elastic decoupling of the shock damper and is intended to alleviate the oscillations acting on the air spring cover. The damper bearing therefore generally comprises a load-bearing piece which is fastened to the free end of the piston rod by a nut on the latter. The load-bearing piece is in turn surrounded by an elastomer element and can be vulcanized together therewith. Generally, the elastomer element bears by its lower side in the damper bearing receptacle, while its radial outer wall bears against the cylindrical part of the damper bearing receptacle.

The thermoset optionally used is phenol formaldehyde (PF) or urea formaldehyde (UF) or melamine formaldehyde (MF) or epoxy resin (EP). The thermoset plastic is optionally reinforced with a filler. Such fillers are short glass fibers (GF), long glass fibers (LF), glass beads (GB), natural fibers (NRP) or mineral fillers.

The thermoset plastics can be bonded and used in various consistencies (free-flowing molding compounds, BMC=Bulk Molding Compounds, SMC=Sheet Molding Compounds) with the different fillers. Compounds consisting of thermoset materials can often be filled to a greater degree and thus have better mechanical and economical properties.

The damper bearing receptacle is optionally pot-shaped. The pot shape is distinguished at least by a bottom and by a hollow cylindrical wall. It is ideally suited to accommodate the damper bearing and can be effectively produced by plastic injection molding methods.

The bottom of the damper bearing receptacle is optionally constructed from the plastic material. In addition, the wall of the damper bearing receptacle is also constructed from the plastic material. Furthermore, the damping bearing receptacle comprises a collar by means of which the air spring strut is attached to the motor vehicle body. The collar or else edge extends radially outwardly from the hollow cylindrical wall. The collar is optionally constructed from the plastic material.

All of these three regions of the pot-shaped damper bearing receptacle channel the acting forces into the body. Their configuration from thermoset material has proved to be extremely stable and load-bearing.

According to a further embodiment, a ribbed structure having a plurality of stiffening ribs is provided within the air spring cover. The ribbed structure is formed inside the air spring cover by way of the plurality of stiffening ribs which are provided between the outer side of the damper bearing receptacle and the inner side of the cover sleeve and connect them. Consequently, the ribbed structure increases the overall strength of the air spring cover, particularly avoiding bursting as a result of the internal gas pressure.

The stiffening ribs are optionally formed from the plastic material of the air spring cover. The stiffening ribs are optionally formed from the thermoset plastic. It is at this point that the advantages of the plastic injection molding method come to the fore since it allows a wide variety of ripped structures to be formed from the same material as the air spring cover in one process.

According to a further embodiment, the clamping base is provided on the inner side with a metallic reinforcing ring. The rolling bellows is attached on its end side to the clamping base. In other words, an end portion of the upper rolling bellows end is in surface contact with the axial bearing surface of the clamping base and is fastened thereto by a clamping or locking ring. Depending on the requirement, a metallic ring is placed on the inner side of the clamping base in order to reinforce it.

According to a further embodiment, the clamping base is produced from the plastic material, optionally as a thermoset. Just like the damper bearing receptacle, the clamping base of the air spring cover is now produced from the plastic. This clamping base has a high strength and also, at the same time, a high elasticity. With an appropriate design of the wall thickness, it also satisfies the force requirements placed on the rolling bellows clamping.

Thermosets are polymer chains which are strongly crosslinked by additional chemical bonds. Consequently, the creep properties of the thermoset material are negligible. Such a strongly crosslinked structure can effect shape-changing deformations only by breakage of bonds, which, in the automobile temperature use range, can occur in a brittle manner only at a very high loading level. A pronounced viscosity at higher temperatures is unknown. They are thus akin under high temperature rather to brittle metals. Nor does the loss of strength or corrosion by water absorption play any role with a suitable choice of polymer.

The sealing tightness of the clamping connection of a thermoset clamping base is more advantageous by comparison with metallic or thermoplastic clamping bases, since the flow property of the thermoset material is better and therefore cavities or defects are more effectively avoided during processing.

According to a further embodiment, the air spring cover is produced in one piece and completely from the plastic material. The entire air spring cover has, for the first time, been produced from a plastic, optionally a thermoset. In this design, the air spring cover comprises no breach of its inner structure for force take-up and of its outer structure for rolling bellows clamping. There is thus no need for separate sealing measures, such as the provision of sealing rings or overmolding of the damper bearing receptacle.

The damper bearing receptacle optionally comprises an inner hollow cylindrical shoulder, wherein the inside diameter of the shoulder is less than the inside diameter of the damper bearing receptacle, with the result that the shoulder forms an annular stop, wherein the damper bearing lies on the annular stop. The shoulder in the damper bearing receptacle is provided if the damper bearing has a thrust bearing. Here, the thrust bearing is positioned in the inner region of the shoulder, while the elastomer element of the damper bearing lies on the annular stop of the shoulder.

A plurality of bores are incorporated in the shoulder. The bores are optionally distributed in the circumferential direction. The bores provide for a material and weight saving, with the strength of the damper bearing receptacle not being adversely affected.

According to another embodiment, the air spring cover is of multipart configuration, at least comprising a first cover part, which comprises the damper bearing receptacle, and a second cover part, which comprises the clamping base, wherein at least the first cover part is produced from the plastic material. The first cover part is optionally produced from a thermoset. Depending on the requirements placed on the volume of the spring cover that is to be encompassed, said cover is of two-part design. Whereas the first cover part represents the damper bearing receptacle, the second cover part forms a volume-encompassing cover or a sleeve which delimits the spring-effective cover chamber. The division into two cover parts increases the design freedom that is required to make available a large cover chamber.

The second cover part and its clamping base are optionally produced from the thermoset material. Just like the one-piece cover, in this design, too, the second cover part has its outer wall and its clamping base produced from one of the stated thermoset materials. This does not necessarily have to be the same thermoset material as that of the first cover part.

Alternatively, the second cover part and its clamping base are produced from a thermoplastic plastic material. It is thus also possible in another design for the second cover part, depending on the requirement, to be produced from a thermoplastic material.

The first cover part is inserted into the second cover part. The at least two-part air spring cover is produced in such a way that the first cover part is inserted by way of its pot-shaped damper bearing receptacle into the recess of the annular second cover part. Here, the collar of the damper bearing receptacle lies on the annular region of the second cover part.

The first cover part is optionally connected to the second cover part in a form-fitting and/or integrally bonded manner. A form fit between the two cover parts is produced for example by a peripheral latching groove of the second cover part within the annular region that engages in a peripheral groove on the outer side of the wall of the damper bearing receptacle. Alternatively or additionally, the two cover parts can also be welded to one another in their joining region. In order to ensure sufficient pressure-tightness, a sealing ring is provided on the contacting regions of the first and second cover part, with the result that the compressed air is prevented from escaping along these contact surfaces.

In an alternative embodiment, the air spring cover comprises a third cover part which is connected as an intermediate member to the first cover part on the one hand and to the second cover part on the other hand. The third cover part is optionally connected to the first cover part in a form-fitting manner. In addition, the third cover part is optionally connected to the second cover part in an integrally bonded manner. It will be understood that the third cover part is produced from a thermoplastic or thermoset material.

According to an embodiment, the air spring cover comprises a plurality of receiving devices and a plurality of fastening means for attaching the air spring strut to the motor vehicle, wherein one of the fastening means is at least partially engaged in a respective one of the receiving devices.

In order to connect the air spring strut to a connection region, which is provided for this purpose, of the motor vehicle body, a plurality of receiving devices and fastening means are provided on the axial upper side of the air spring cover or of the first cover part. The fastening means, for example as screw bolts, comprise a shank with a head or anchor. The head or anchor is engaged in a receiving device provided in the air spring cover. The receiving devices are recesses which extend axially in the air spring cover. Since the air spring cover is injection-molded from a plastic material, the head or anchor of the fastening means is overmolded in the respective receiving devices by this plastic material, with the result that said fastening means are held securely in the receiving devices. The receiving devices are arranged in a distributed manner in the circumferential direction on the annular upper side of the air spring cover.

The air spring cover thus represents, by way of its damper bearing receptacle formed from plastic material and by way of the receiving devices, the decisive force path into the motor vehicle body of the tensile and compressive forces which emanate from the shock damper.

The rolling bellows delimits, with the air spring cover and the rolling piston, a working chamber which is filled with compressed air. This volume-elastic working chamber represents the spring-effective volume of the air spring.

The air spring cover optionally comprises a cover chamber. This cover chamber, optionally as a large-volume air chamber, expands the working chamber of the air spring and thus reduces the spring stiffness thereof.

The air spring strut is used in a chassis, optionally in an air spring system, for a motor vehicle.

FIG. 1 shows a known air spring strut 1 having the components, namely air spring 2 and shock damper 3, wherein the air spring 2 comprises an air spring cover 4, a rolling piston 5 and a rolling bellows 6 with an outer guide 7 which encloses it in the form of a sleeve. The shock damper 3 is provided within the air spring 2, the shock damper 3 comprising a damper tube 14, a piston rod 15 which can dip into the latter, and a damper bearing 11.

The air spring strut 1 satisfies two functional areas: on the one hand, the air spring 2 satisfies the generation of carrying force, whereas the shock damper 3 is responsible for linear guidance. Fastening means on the air spring cover 4 make it possible for the air spring strut 1 to be fastened on the one hand to a motor vehicle body and on the other hand, via a shock damper eye (not shown), to a wheel carrier of the motor vehicle chassis, with the result that the motor vehicle is spring-cushioned and damped.

This regular installed position of an air spring strut determines the "up/down" orientation.

The air spring 2 comprises a rolling bellows 6 of elastomer material, the rolling bellows 6 delimiting, with the air spring cover 4 and rolling piston 5, an airtight, volume-elastic working chamber 10 which can be filled with compressed air. The hose-shaped rolling bellows 6 is fastened by its first end to the air spring cover 4 and by its second end to the rolling piston 5 via clamping rings 18 at the connection regions of these air spring attachment parts.

In the case of relative movements along the longitudinal axis L of the air spring strut 1 between the air spring cover 4 and rolling piston 5, the rolling bellows 6 rolls on the concentric rolling surface of the rolling piston 5 with the formation of a rolling fold 8. Furthermore, the rolling bellows 6 forms a cardanic fold 9 on the air spring cover 4 that acts as a cardanic bearing. At the same time, the rolling bellows 6 is provided with embedded strength members.

Particularly in the case of the comfortable axial bellows, that is to say with strength members oriented in the axial direction, use is made of outer guides 7 to limit the lateral extension of the rolling bellows 6. Here, the outer guide 7 is clamped against the rolling bellows 6 by an inner locking ring 12 provided in the working chamber 10.

In order to protect the rolling fold 8 from contamination, there is provided a corrugated bellows 19 which is fastened, for example, to the wheel-carrier-side end region of the outer guide 7 and to the damper tube 14.

An additional spring 16 is arranged bearing against the lower side of the air spring cover 4 and facing toward the shock damper. The additional spring 16 has a through-bore for the piston rod 15 and therefore encloses the latter. During spring compression, the end side of the damper tube 14 moves toward the air spring cover 4, and therefore the additional spring 16 serves as a travel limiter and damps possible forces acting on the air spring cover 4.

The damper tube 14 of the shock damper 3 is provided within the rolling piston 5 or is surrounded by the hollow cylindrical rolling piston 5 at least in certain regions, it being possible for the rolling piston 5 to be fastened standing on the damper tube via a supporting ring 17 or hanging on the end side of the damper tube 14 via a bearing element 13. A combination of standing and hanging rolling piston 5 is also possible, as visible in the figure. It is additionally known to produce the rolling piston 5 from a light metal, such as aluminum, or a fiber-reinforced plastic.

In the case of a standing rolling piston 5, a sealing system 20, for example made up of elastomer sealing rings, is provided between the piston end region facing the wheel carrier and the opposite outer wall of the damper tube 14. This serves to seal to the outside the working chamber 10, which can be expanded within the rolling piston, of the air spring 2.

Figure 2:
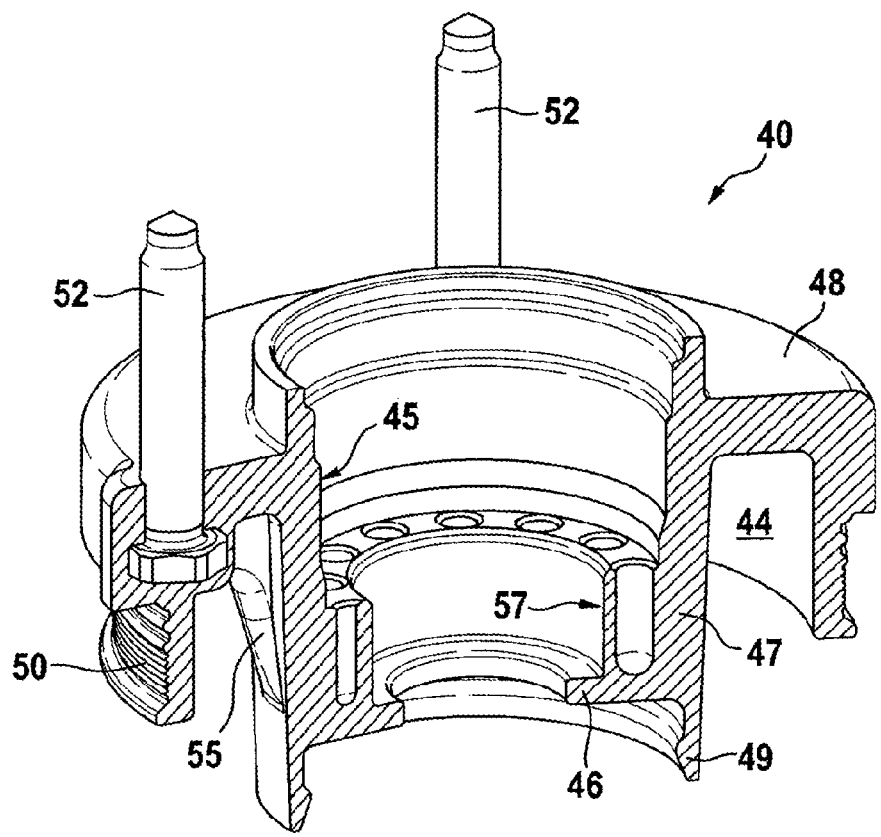
FIG. 2 shows a first exemplary embodiment of an air spring cover.

FIG. 2 shows a one-piece air spring cover 40 in a perspective view and in vertical section.

The air spring cover 40 of an exemplary air spring strut comprises an inner pot-shaped damper bearing receptacle 45 into which the damper bearing of a shock damper is inserted. At the same time, the entire air spring strut is attached by means of the air spring cover 40 to a motor vehicle body (not shown).

In order to mount the damper bearing, the inner pot-shaped damper bearing receptacle 45 comprises a pot bottom 46 with a through-bore for the shock damper piston rod. The damper bearing receptacle 45 is configured in the present case in such a way that it comprises a reduced-diameter region or shoulder 57. A thrust bearing of the damper bearing is then positioned in the smaller region of this shoulder 57, which is connected to the pot bottom 46. Furthermore, the smaller-diameter region forms, by virtue of the shoulder 57, an upper-side annular stop. Axial bores are provided in this annular stop and afford a saving of material. In the installed state, the damper bearing is therefore set down on the annular stop of the shoulder 57, with the thrust bearing being situated in the narrowed-diameter region of the damper bearing receptacle 45. This also means that the larger-diameter region of the damper bearing receptacle 45 situated above the shoulder 57 is provided for receiving the damper bearing.

This region is formed by a hollow cylindrical pot wall 47. The pot wall 47 extends axially upward from the pot bottom 46. At the upper edge of the pot wall 47, the latter merges into a radially outwardly extending pot collar 48. Finally, the pot collar 48 is extended downward and constitutes a clamping base 50 for rolling bellows attachment.

Furthermore, an additional-spring pot 49, into which an additional spring is inserted, is provided on the lower side of the damper bearing receptacle 45, that is to say on the side of the pot bottom 46 that faces away from the attachment to the motor vehicle body.

For pressure-tight sealing of the damper bearing, the latter is closed, in the installed state, from above by a closure cover. For this purpose, annularly encircling grooves or constrictions are formed on the inner wall of the damper bearing receptacle 45 or on the inner side of the pot wall 47. The closure cover is inserted and pressed into said grooves or constrictions.

By virtue of the pot collar 48 extended downward to form the clamping base 50, the air spring cover 40 at least partially makes available a cover chamber 44 which, as an air chamber expansion of the working chamber of the air spring, reduces the spring stiffness of said spring.

The pot collar 48 additionally comprises receiving devices for fastening means 52. Fastening means 52, or the shank and head of screw bolts, are engaged in said receiving device and are overmolded by the material of the air spring cover 40 and therefore secured. The receiving devices are arranged in a distributed manner in the circumferential direction on the pot collar 48 and extend axially into said collar. The openings of the receiving device open on the axial surface of the pot collar 48. According to the example, three such receiving devices with respective fastening means 52 are provided. The air spring cover 40 is therefore screwed to the motor vehicle body in a force-fitting manner by way of the fastening means 52.

In order to make the air spring cover 40 tear-resistant or burst-resistant, a plurality of flat stiffening ribs 55 are provided in its interior. Starting from the outer wall of the pot wall 47, stiffening ribs 55 extend upwardly in a star pattern toward the underside of the pot collar 48 and at least partially toward the inner side of the clamping base 50.

An aspect of the air spring cover 40 of the exemplary air spring strut is its material choice.

Particularly the structure- and strength-relevant region of the air spring cover 40, in concrete terms the damper bearing receptacle 45, is produced as a thermoset or from a thermoset material. It has proved to be the case that, with an appropriate design of the pot bottom 46 and of the pot wall 47, the thermoset material satisfies the strength requirements placed on it. That is to say in particular that the tensile and compressive forces acting on the damper bearing receptacle 45 are reliably taken up and transmitted into the motor vehicle body. At the same time, the thermoset damper bearing receptacle 45 is lighter than a comparable damper bearing receptacle made of a metallic material.

Another aspect of the air spring cover 40 shown is its clamping base 50 produced from thermoset material. Said annularly encircling clamping base 50 constitutes an axial bearing surface for the attachment of the upper rolling bellows end. In a further embodiment (not shown), the clamping base 50 is reinforced on the inner side with a metallic reinforcing ring.

The clamping base 50 of the air spring cover 40 is advantageously produced from the same thermoset material as the cover 40 itself. The production of the clamping base 50 from thermoset material leads to a high strength combined with high elasticity and low density.

Therefore, the air spring cover 40 with clamping base made of thermoset material ensures cost-effective manufacturing and an overall lighter air spring strut.

Figure 3:
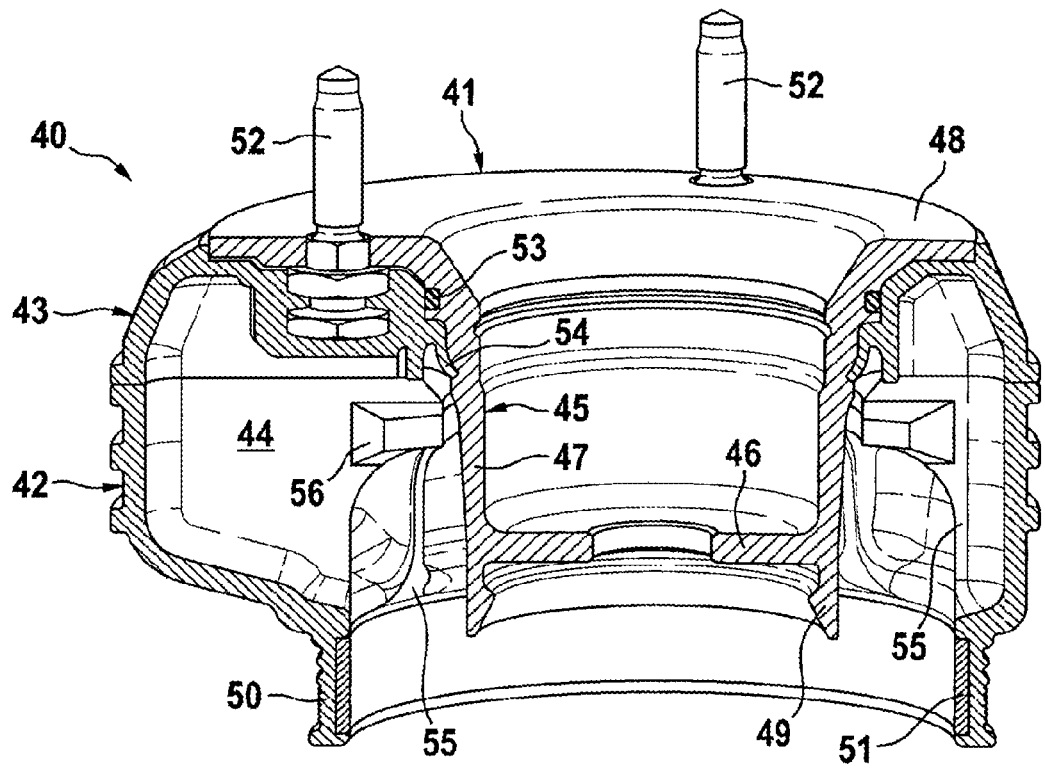
FIG. 3 shows a second exemplary embodiment of an air spring cover.

FIG. 3 shows in perspective view a multipart air spring cover 40 in vertical section of an exemplary air spring strut.

To satisfy the requirements placed on the air spring cover 40 (force take-up and volume formation), it has been subdivided into a plurality of cover parts 41, 42, 43.

A first cover part 41 serves to receive the shock damper bearing and in part also to fasten the air spring strut to a motor vehicle body (not shown). In order to mount the damper bearing, the first cover part 41 has an inner pot-shaped damper bearing receptacle 45. This damper bearing receptacle 45, which is formed from the material of the first cover part 41, comprises a pot bottom 46 with a through-bore for the shock damper piston rod. Extending from the pot bottom 46 in the axial direction is a substantially hollow cylindrical pot wall 47 which is formed from the material of the first cover part 41. At the upper edge of the pot wall 47, the latter merges into a radially outwardly extending pot collar 48.

Furthermore, an additional-spring pot 49, which is likewise formed from the material of the first cover part 41 and into which an additional spring is inserted, is provided on the lower side of the damper bearing receptacle 45, that is to say on the side of the pot bottom 54 that faces away from the attachment to the motor vehicle body.

For pressure-tight sealing of the damper bearing, the latter is closed, in the installed state, from above by a closure cover. For this purpose, an annularly encircling groove and a gradation or constriction are formed on the inner wall of the damper bearing receptacle 45 or on the inner side of the pot wall 47. The closure cover is inserted and pressed into said groove and constriction.

The shape and configuration of a second cover part 42 realizes a part of the spring-effective cover volume. A cover chamber 44 is decisively determined and delimited by the outer wall of the second cover part 42. The air chamber of the cover chamber 44 expands the working chamber of the air spring and serves for comfortable spring behavior.

In addition, a second cover part 42 is provided for rolling bellows attachment and therefore comprises an annularly encircling clamping base 50 with an axial bearing surface for the upper rolling bellows end. For the purpose of improved clamping, the clamping base 50 is reinforced on the inner side by a metallic reinforcing ring 51. The reinforcing ring 51 counteracts the radial pressing force of the adjoining rolling bellows clamping and therefore supports the rolling bellows clamping with regard to its tightness requirement.

A third cover part 43 is decisively responsible for fastening the air spring cover 40 or the entire air spring strut to the motor vehicle body. The third cover part 43 comprises an annular portion which provides a receiving device for respective fastening means 52. Fastening means 52, or the head and shank of screw bolts, are engaged in these receiving devices and overmolded by the material of the third cover part 43 and therefore secured. The receiving devices are arranged in a distributed manner on the annular portion in the circumferential direction and extend axially into the material of the third cover part 43. The openings of the receiving devices open at the axial surface of the third cover part 43 or of the annular portion. By way of example, three such receiving devices with respective fastening means 52 are provided.

In addition, the third cover part 43 comprises an outer wall with a peripheral axial joining surface for connecting the second cover part 42. Starting from the annular region of the third cover part 43, this outer wall extends outwardly and then downwardly.

The air spring cover 40 is consequently assembled or joined together from cover parts 41, 42, 43. For this purpose, the first cover part 41 is inserted into the third cover part 43 such that the first cover part 41 lies with its pot collar 48 on the annular portion of the third cover part 43. The fastening means 52 provided in the third cover part 43 are plugged through the corresponding through-bores in the pot collar 48 of the first cover part 41. Therefore, the air spring cover 40 is screwed to the motor vehicle body in a force-fitting manner by means of the first and third cover part 41 and 43 using the fastening means 52.

For the purpose of pressure-tight and secure connection of the first cover part 41 to the third cover part 43, a sealing ring 53 and a form fit is provided between their radial contact surfaces. The sealing ring 53 is positioned in a peripheral groove of the outer wall of the damper bearing receptacle 45. Another positioning of the sealing ring 53, or in the axial position between the pot collar 48 and the annular portion of the third cover part 43, is likewise possible. This prevents the compressed air escaping from the cover chamber 44 to the outside along the contact surface of the two cover parts 41 and 43. The form fit between the first cover part 41 and the third cover part 43 is achieved by a lip 54 and an undercut. The outer wall of the damper bearing receptacle 45 provides a peripheral undercut or a notch in which the lip 54 of the third cover part 43 engages. As a result, the first cover part 41 cannot fall upwardly out of the third cover part 43.

To complete the air spring cover 41, the second cover part 42 is connected in the annularly encircling joining region to the third cover part 43 in an integrally bonded manner. Known plastic welding methods are used for this purpose.

In order to configure the air spring cover 40 to be tear- or burst-resistant, a plurality of stiffening ribs 55 consisting of the material of the cover parts 41, 42, 43 are formed in its interior. Starting from the inner wall of the second and third cover part 42 and 43, the stiffening ribs 55 of flat design lead to the damper bearing receptacle 45. The stiffening ribs 55 can be distributed in a star pattern from the damper bearing receptacle 45 and extend in the direction of the inner wall of the second and third cover part 42 and 43. However, it is also possible that the stiffening ribs 55, starting from and connected to the second and third cover part 42 and 43, extend in the direction of the damper bearing receptacle 45 and end spatially spaced apart shortly before its outer wall. For example, there is then provided a stiffening ring 56 which extends around the damper bearing receptacle 45 and by means of which the individual stiffening ribs 55 are connected to one another.

In addition, the stiffening ribs 55, which are formed by the material of the second and third cover part 42 and 43, have the advantage that their common joining region is enlarged. In other words, the contact surface to be welded of the two cover parts 42 and 43 is enlarged by the reinforcing ribs 55 and hence the bond strength of the two cover parts 42 and 43 is also increased.

An aspect of the air spring cover 40 shown in FIG. 3 is likewise its material choice from thermoset material. The statements made regarding the air spring cover of FIG. 2 relating to this material apply in an equivalent manner to the air spring cover 40 of FIG. 3. This particularly also concerns the strength requirements of the damper bearing receptacle 45 of the multipart air spring cover 40.

The second cover part 42 and thus also the third cover part 43 are likewise produced from a thermoset material. As an alternative, the volume-forming outer wall of the second cover part 42 is constructed from a thermoplastic, optionally fiber-reinforced, plastic. This also applies to the third cover part 43. Such a thermoplastic plastic can be a polyamide (PA6, PA6.6, PA12) filled with long glass fibers or with carbon fibers.

Another aspect of the air spring cover 40 shown in FIG. 3 is likewise its clamping base 50 made of thermoset material. Here, too, the statements given for the air spring cover of FIG. 2 apply in an equivalent manner to the multipart air spring cover 40 of FIG. 3. In a further embodiment, the clamping base 50 is reinforced on the inner side with a metallic reinforcing ring 51.

LIST OF REFERENCE SIGNS

1 Air spring strut
2 Air spring
3 Shock damper
4 Air spring cover
5 Rolling piston
6 Rolling bellows
7 Outer guide
8 Rolling fold
9 Cardanic fold
10 Working chamber
11 Damper bearing
12 Inner locking ring
13 Bearing element
14 Damper tube
15 Piston rod
16 Additional spring
17 Supporting ring
18 Clamping ring
19 Corrugated bellows
20 Sealing system
40 Air spring cover
41 First cover part
42 Second cover part
43 Third cover part
44 Cover chamber
45 Damper bearing receptacle
46 Pot bottom
47 Pot wall
48 Pot collar
49 Additional-spring pot
50 Clamping base
51 Reinforcing ring
52 Fastening means
53 Sealing ring
54 Lip
55 Stiffening ribs
56 Stiffening ring
57 Shoulder

The invention claimed is:

1. An air spring strut for a motor vehicle comprising:
an air spring with a shock damper for spring-cushioning and damping of oscillations of a motor vehicle chassis;
wherein the air spring comprises an air spring cover and a rolling piston, the air spring cover is produced in one piece and completely from the plastic material;
wherein a rolling bellows of elastomer material is clamped in an airtight manner between the air spring cover and the rolling piston;
wherein the air spring cover comprises a damper bearing receptacle in which a damper bearing of the shock damper is arranged, and wherein the air spring cover comprises a clamping base to which a first end of the rolling bellows is attached;
wherein the damper bearing receptacle comprises an inner hollow cylindrical shoulder, wherein an inside diameter of the shoulder is less than the inside diameter of the damper bearing receptacle, with the result that the shoulder forms an annular stop, wherein the damper bearing lies on the annular stop; and
wherein a plurality of bores is incorporated in the shoulder.

2. An air spring strut for a motor vehicle comprising:
an air spring with a shock damper for spring-cushioning and damping of oscillations of a motor vehicle chassis;
wherein the air spring comprises an air spring cover and a rolling piston;
wherein a rolling bellows of elastomer material is clamped in an airtight manner between the air spring cover and the rolling piston;
wherein the air spring cover comprises a damper bearing receptacle in which a damper bearing of the shock damper is arranged, and wherein the air spring cover comprises a clamping base to which a first end of the rolling bellows is attached;
wherein at least the damper bearing receptacle of the air spring cover is produced from a plastic material;
wherein the air spring cover comprises a plurality of receiving devices and a plurality of fasteners configured to attach the air spring strut to the motor vehicle, wherein one of the fasteners is at least partially engaged in a respective one of the receiving devices; and
wherein the plurality of fasteners are at least partially overmolded with the plastic material of the air spring cover.

3. The air spring strut as claimed in claim 2, wherein the plastic material is a thermoset.

4. The air spring strut as claimed in claim 3, wherein the thermoset used is one of phenol formaldehyde, urea formaldehyde, melamine formaldehyde, and epoxy resin.

5. The air spring strut as claimed in claim 4, wherein the thermoset is reinforced with a filler.

6. The air spring strut as claimed in claim 2, wherein a ribbed structure having a plurality of stiffening ribs is provided within the air spring cover.

7. The air spring strut as claimed in claim 6, wherein the stiffening ribs are formed from the plastic material of the air spring cover.

8. The air spring strut as claimed in claim 2, wherein the clamping base is provided on an inner side with a metallic reinforcing ring.

9. The air spring strut as claimed in claim 2, wherein the clamping base is produced from the plastic material of the air spring cover.

10. The air spring strut as claimed in claim 2, wherein the air spring cover is produced in one piece.

11. The air spring strut as claimed in claim 10, wherein the damper bearing receptacle comprises an inner hollow cylindrical shoulder, wherein an inside diameter of the shoulder is less than the inside diameter of the damper bearing receptacle, with the result that the shoulder forms an annular stop, wherein the damper bearing lies on the annular stop.

12. The air spring strut as claimed in claim 2, wherein the air spring cover is of multipart configuration, at least comprising a first cover part, which comprises the damper bearing receptacle, and a second cover part, which comprises the clamping base, wherein at least the first cover part is produced from the plastic material.

13. The air spring strut as claimed in claim 12, wherein the second cover part and its clamping base are produced from a thermoset plastic material.

14. The air spring strut as claimed in claim 12, wherein the second cover part and its clamping base are produced from a thermoplastic plastic material.

15. The air spring strut as claimed in claim 12, wherein the first cover part is inserted into the second cover part.

16. The air spring strut as claimed in claim 12, wherein the air spring cover comprises a third cover part which is connected as an intermediate member to the first cover part and to the second cover part.

17. The air spring strut as claimed in claim 2, wherein the air spring cover comprises a plurality of receiving devices and a plurality of fasteners configured to attach the air spring strut to the motor vehicle, wherein one of the fasteners is at least partially engaged in a respective one of the receiving devices.

* * * * *